(12) United States Patent
Lee

(10) Patent No.: US 7,387,852 B2
(45) Date of Patent: Jun. 17, 2008

(54) POLYMER ELECTROLYTE AND LITHIUM BATTERY USING THE SAME

(75) Inventor: Yong-beom Lee, Suwon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 720 days.

(21) Appl. No.: 10/440,245

(22) Filed: May 19, 2003

(65) Prior Publication Data

US 2004/0043298 A1 Mar. 4, 2004

(30) Foreign Application Priority Data

Aug. 31, 2002 (KR) .................. 10-2002-0052280

(51) Int. Cl.
*H01M 6/18* (2006.01)
(52) U.S. Cl. .............. 429/306; 429/309; 429/314; 429/317; 429/231.1; 429/231.3; 429/231.8; 429/231.4; 429/231.95; 429/331; 429/332; 429/337; 429/338; 429/342
(58) Field of Classification Search .......... 429/306, 429/309, 314, 317, 231.1, 231.3, 231.95, 429/231.8, 231.4, 331, 332, 337, 338, 342
See application file for complete search history.

(56) References Cited

U.S. PATENT DOCUMENTS 6,395,429 B1 * 5/2002 Kang et al. ............. 429/306

2002/0160256 A1 * 10/2002 Kami et al. ............. 429/122

FOREIGN PATENT DOCUMENTS

| FR | 2 814 284 | * | 3/2002 |
| JP | 2000-348765 | * | 12/2000 |
| JP | 2001-40168 | * | 2/2001 |
| JP | 2001-57234 | * | 2/2001 |
| KR | 10-303394 | | 7/2001 |
| KR | 2002-17928 | | 3/2002 |

OTHER PUBLICATIONS

Office Action issued on Feb. 21, 2008 by the Korean Intellectual Property Office for Korean Patent Appplication No. 2002-52280.

* cited by examiner

*Primary Examiner*—Laura Weiner
(74) *Attorney, Agent, or Firm*—Stein, McEwen & Bui, LLP

(57) ABSTRACT

A polymer electrolyte extends the cycle life, improves the safety, and reduces the swelling of a battery, compared with a polymer electrolyte containing a poly(alkylene oxide) polymer. Also, a lithium battery utilizes the polymer electrolyte. The polymer electrolyte contains a polymerized product from a polymer electrolyte forming composition containing a multifunctional isocyanurate monomer of a particular structure, a lithium salt, and a non-aqueous organic solvent.

9 Claims, 1 Drawing Sheet

POLYMER ELECTROLYTE AND LITHIUM BATTERY USING THE SAME

CROSS-REFERENCE TO RELATED APPLICATIONS

This application claims priority from Korean Patent Application No. 2002-52280, filed on Aug. 31, 2002, in the Korean Intellectual Property Office, the disclosure of which is incorporated herein in its entirety by reference.

BACKGROUND OF THE INVENTION

1. Field of the Invention

The present invention relates to a polymer electrolyte and a lithium battery using the same, and more particularly, to a polymer electrolyte with extended cycle life, improved safety, and reduced swelling by using a multifunctional isocyanurate monomer, and a lithium battery using the polymer electrolyte.

2. Description of the Related Art

The recent popularization of portable electronic information devices such as notebook computers and camcorders and of wireless communications devices, such as mobile phones, has increased the need for small, lightweight rechargeable secondary batteries that can be used as power supplies for such portable devices.

The most widely used secondary batteries developed to date include lithium cadmium batteries, nickel-hydride batteries, and lithium batteries. Among the cited kinds of secondary batteries, lithium batteries attract more attention as a possible next-generation power supply due to having an extended cycle life and a high capacity.

In a liquid electrolyte lithium secondary battery containing a low boiling point organic solvent for improved low-temperature performance, the electrode assembly or the pouch packaging the electrode assembly may swell when left under high temperature conditions. As a result, the high-temperature reliability and the safety of the battery degrade.

To solve this problem, methods using polymer solid electrolytes have been suggested. The use of solid polymer electrolytes reduces the likelihood of electrolyte leaking and improves battery safety, as compared with the case of using liquid electrolytes.

However, when such a polymer solid electrolyte is used, the ion conductivity becomes lower than the case of using liquid electrolytes. Therefore, there is an urgent need for the development of polymer solid electrolytes with high ionic conductivity and improved electrochemical stability in order for the polymer solid electrolytes to be applied practically to lithium secondary batteries.

Linear polymers or cross-linked polymers derived by the polymerization of alkylene oxides such as ethylene oxide and propylene oxide are used mostly as ionic conductive polymers for the polymer solid electrolyte. However, in a lithium battery using a polymer synthesized from such kinds of monomers as a matrix, the cross-linked network structure of the polymer matrix and strong interactions between lithium ions and alkylene oxide residue in the matrix lower the mobility of the lithium ions, thus resulting in degraded high rate discharge, low-temperature discharge, and reduced cycle life characteristics.

Such drawbacks can be improved by increasing the amount of organic solvent used above a predetermined level. However, the increased amount of organic solvent hinders the formation of a cross-linked polymer matrix and causes the liquid electrolyte to leak from the gel matrix. As a result, the electrode assembly or the pouch packaging the electrode assembly swells significantly at high temperature. Therefore, various performance improvements are needed for such polymer electrolyte lithium batteries using a poly(alkylene oxide) polymer.

SUMMARY OF THE INVENTION

The present invention provides a polymer electrolyte for lithium batteries that is free from the above-cited problems.

The present invention also provides a lithium battery with an extended cycle life, improved safety, and reduced swelling by using the polymer electrolyte.

According to an aspect of the present invention, a polymer electrolyte comprises a polymerized product from a polymer electrolyte forming composition containing a multifunctional isocyanurate monomer of Formula (1) below, a lithium salt, and a non-aqueous organic solvent:

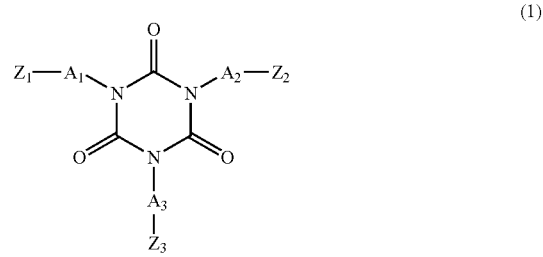

where $A_1$, $A_2$, and $A_3$ are independent $C_1$-$C_{10}$ alkylene groups or $C_1$-$C_{10}$ arylene groups; and $Z_1$, $Z_2$, and $Z_3$ are substitute groups of Formula (2) below:

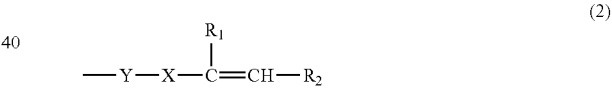

where X is

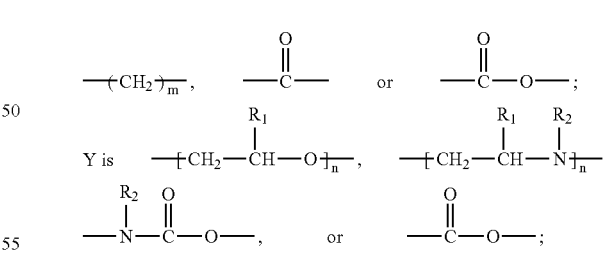

each of $R_1$ and $R_2$ is at least one independently selected from the group consisting of hydrogen, $C_1$-$C_{10}$ alkyl, $C_1$-$C_{10}$ fluorinated alkyl, $C_1$-$C_{10}$ aryl, and $C_1$-$C_{10}$ fluorinated aryl; m is an integer from 0 to 10; and n is an integer from 0 to 5.

According to another aspect of the present invention, there is provided a lithium battery comprising: an anode, a cathode, and the above polymer electrolyte interposed between the anode and the cathode.

The polymer electrolyte according to the present invention is derived by the polymerization of a polymer electrolyte forming composition containing an isocyanurate monomer of Formula (1) above and gives a lithium battery with extended cycle life, improved safety, and reduced high-temperature swelling properties.

According to the present invention, the polymer electrolyte forming composition containing the multifunctional isocyanurate monomer of Formula (1) above may further comprise an ethylenically unsaturated monomer such as, for example, polyethylene glycol diacrylate, polyethylene glycol dimethacrylate, diethylene glycol diacrylate, diethylene glycol dimethacrylate, caprolactonated dipentaerythritol hexacrylate. The ethylenically unsaturated monomer may be monofunctional or multifunctional.

The polymerized products of the ethylenically unsaturated monomer improve the physical properties of the polymer electrolyte matrix and the ability to retain organic solvents therein.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
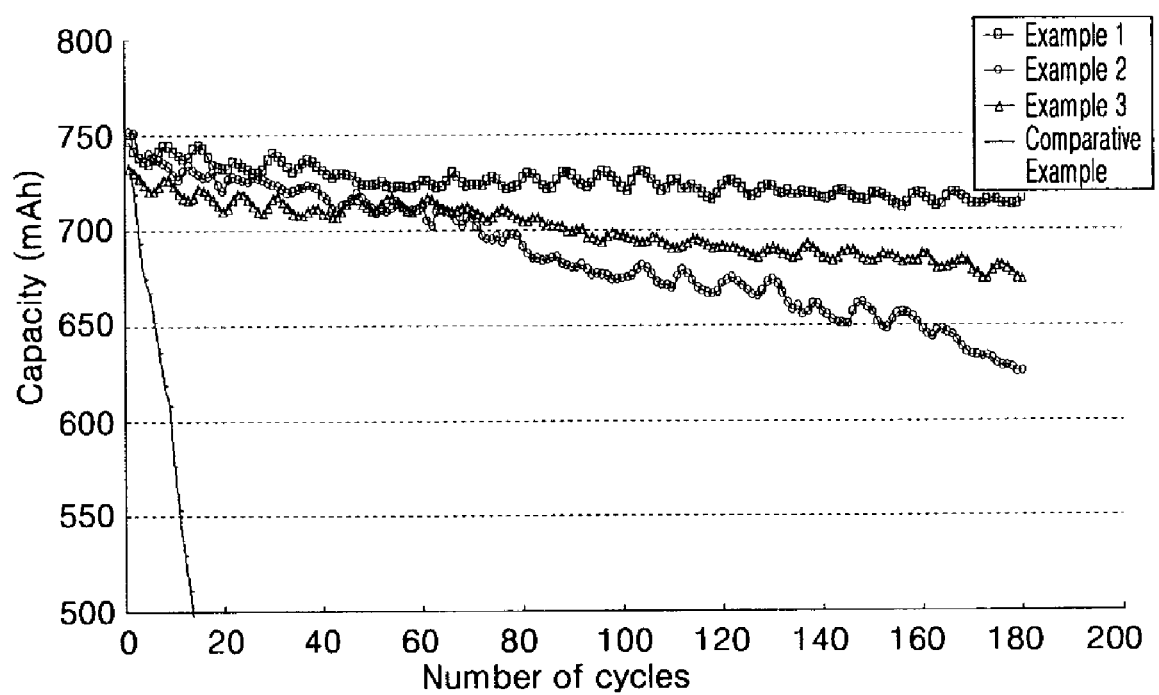
FIG. 1 is a graph showing the results of a cycle life test using the lithium batteries manufactured in Examples 1 through 3 and Comparative Example.

Reference will now be made in detail to the present preferred embodiments of the present invention, examples of which are illustrated in the accompanying drawings, wherein like reference numerals refer to the like elements throughout. The embodiments are described below in order to explain the present invention by referring to the FIGURE.

A method of preparing a polymer electrolyte according to the present invention is described below. The polymer electrolyte comprises a polymer matrix and an electrolytic solution.

Materials for the polymer matrix include a multifunctional isocyanurate monomer having Formula (1) above and may further comprise an ethylenically unsaturated monomer, if necessary. The materials for the polymer matrix may be mixed with an electrolytic solution of a lithium salt in an organic solvent to provide a polymer electrolyte forming composition.

In the polymer electrolyte forming composition, it is preferable that the polymer matrix material(s) and the electrolyte solution be mixed in a weight ratio of 1:0.1-1:50. If the amount of the polymer matrix material(s) is less than the above range, the resulting polymer film has poor mechanical properties, and the cross-linked matrix is hardly formed. If the amount of the polymer matrix material(s) exceeds the above range, some portion of the polymer matrix material(s) may remain unreacted, thus leading to undesirable side reactions in a battery. In addition, the mobility of lithium ions in the battery is reduced, thus degrading battery performance.

When a mixture of the multifunctional isocyanurate monomer of Formula (1) above and an ethylenically unsaturated monomer is used for the polymer matrix material, it is preferable that the amount of the ethylenically unsaturated monomer be no greater than 95 parts by weight with respect to 100 parts by weight of the multifunctional isocyanurate monomer. If the amount of the ethylenically unsaturated monomer exceeds the above level, the resulting cross-linked polymer matrix is less stable.

Alternatively, a polymerization initiator may further be added to the polymer electrolyte forming composition, followed by mixing until the composition becomes homogeneous. Suitable polymerization initiators include, but are not limited to, diacyl peroxides such as, for example, dibenzoyl peroxide, succinic peroxide, dilauroyl peroxide, and didecanoyl peroxide; dialkyl peroxides such as, for example, dicumyl peroxide, and di-t-butylperoxide, 2,5-dimethyl-2,5-di-(t-butylperoxy)hexane; peroxy esters such as, for example, t-butyl peroxy ester, α-cumyl peroxy-neodecanoate, 1-1-dimethyl-3-hydroxybutyl peroxy-2-ethyl hexanoate), t-amyl peroxy-benzoate, and t-butyl peroxy-pivalate; tertiary alkyl hydroperoxides such as, for example, 2,5-dihydroxyperoxy-2,5-dimethylhexane, cumene hydroperoxide, and t-butyl hydroperoxide; peroxy ketals such as, for example, 1,1-di-(t-amylperoxy)-cyclohexane, 2,2-di-(t-butyl peroxy)butane, and ethyl 3,3-di-(t-butylperoxy)-butylate; peroxy carbonates such as, for example, t-butyl peroxy isopropyl carbonate and t-butyl peroxy 2-ethylhexyl carbonate; peroxy dicarbonates such as, for example, di(n-propyl) peroxy dicarbonate, di(sec-butyl) peroxy dicarbonate, di(2-ethylhexyl) peroxy dicarbonate, and di(4-t-butylcyclohexyl) peroxy dicarbonate; and azo compounds such as, for example, AIBN, azobis(2,4-dimethyl valeronitrile), and azobis(cyclohexanecarbonitrile), which may be used alone or in combination. It is preferable that the amount of such polymerization initiators be in the range of 0.001-10 parts by weight with respect to 100 parts by weight of the monomers.

However, peroxide compounds such as dialkyl peroxides, peroxy esters, peroxy ketals, peroxy carbonates, and peroxy dicarbonates are more preferable as the polymerization initiator than azo compounds because azo compounds produce inert nitrogen gas during thermal polymerization that inhibits the formation of a homogeneous polymer electrolyte, thus degrading the battery performance. Meanwhile, peroxide compounds produce $CO_2$ gas during thermal polymerization that is highly soluble in the electrolytic solution, so that a homogeneous polymer electrolyte can be effectively formed. In addition, $CO_2$ is known to improve the battery performance by forming a protective coating on the anode. Therefore, it is preferable to use such peroxide compounds as the thermal polymerization initiator.

One of the following three methods may be applied in manufacturing a polymer electrolyte and a battery using the above polymer electrolyte forming composition: method (1) involving forming a polymer electrolyte film using the composition and inserting the polymer electrolyte film between the cathode and the anode; method (2) involving casting the above composition onto the cathode and anode and polymerizing the composition; and method (3) involving making an electrode assembly by forming a combined structure of the cathode, the anode, and a separator interposed between in a roll or stack form, sealing the electrode assembly in a battery case such as a pouch, injecting a polymer electrolyte forming composition into the battery case, and thermally polymerizing the polymer electrolyte forming composition in the battery case.

According to method (1) above, the polymer electrolyte forming composition is applied to a support substrate for casting, and is then polymerized using heat, UV light, electron beams, and the like. A glass substrate, a TEFLON® substrate, and the like may be used for the support substrate. For thermal polymerization, the polymerization temperature is in the range of, preferably, 25-100° C., and more preferably, 60-80° C. A polymerization temperature above 100° C. causes the electrolytic solution to volatilize or the lithium salt to decompose. A polymerization temperature less than 25° C. hinders a smooth polymerization reaction. For photopolymerization, UV light, y-rays, glow discharge rays, or plasma may be used as an energy source, in which UV light is preferable because it is economical and is the most convenient to use. The UV light used may have a wavelength of 200-400 nm.

After the polymerization reaction (curing reaction) has been completed, the resulting polymer electrolyte film according to the present invention is separated from the support substrate.

In the above method for manufacturing the polymeric electrolyte film, any organic solvent commonly used in lithium batteries may be used for the electrolytic solution. Examples of such an organic solvent include ethylene carbonate, propylene carbonate, dimethyl carbonate, methylethyl carbonate, diethyl carbonate, methylpropyl carbonate, ethylpropyl carbonate, methylbutyl carbonate, tetrahydrofuran, 2-methyltetrahydrofuran, diethoxyethane, methylformate, ethylformate, triglyme, tetraglyme, fluorobenzene, difluorobenzene, γ-butyrolactone, and mixtures of the foregoing organic solvents. It is preferable that the amount of the organic solvent be in the range of 10-5000 parts by weight with respect to 100 parts by weight of the monomer(s) in the polymer electrolyte forming composition.

Suitable examples of a lithium salt for the electrolytic solution include, but are not limited to, $LiPF_6$, $LiClO_4$, $LiBF_4$, $LiBF_6$, $LiCF_3SO_3$, $LiAsF_6$, $LiN(SO_2CF_3)_2$, $LiC_4F_9SO_3$, $LiN(SO_2C_2F_5)_2$, and a mixture of the foregoing salts. It is preferable that the concentration of the lithium salt in the electrolytic solution be in the range of 0.5-3.0 mol/L. If the concentration of the lithium salt is less than 0.5 mol/L, the discharge capacity of the resulting lithium battery is insufficient. If the concentration of the lithium salt is greater than 3.0 mol/L, the viscosity of the electrolytic solution is increased, thus lowering battery performance.

Alternatively, a polymer electrolyte forming composition according to the present invention may further include various kinds of additives such as an adhesive enhancer, a filler, and the like in order to enhance the mechanical strength of the polymer electrolyte and interfacial properties with electrodes.

Method (1) for manufacturing a lithium battery using the polymer electrolyte formed according to the present invention is described below in detail.

Initially, a cathode and an anode are manufactured using known methods used to manufacture lithium batteries. In particular, active material layers for the cathode and anode are formed using electrode active material compositions containing electrode active materials, a binder, and a conductive agent when necessary, and a solvent. The active material layers are formed either by directly coating a current collector with an electrode active material composition or by forming an electrode active material film on a support by coating and drying of an electrode active material composition and then laminating a current collector with the electrode active material film which has been separated from the support. Any support capable of supporting the active material layer can be used without limitation. Suitable examples of such a support include a Mylar film, a polyethylene terephthalate (PET) film, and the like.

Suitable cathode active materials include lithium manganese oxides, lithium cobalt oxides, lithium nickel oxides, lithium chromium oxides, sulfur, sulfur-containing compounds, and mixtures of the foregoing materials, and specifically, $LiCoO_2$, $LiMnO_2$, $LiNiO_2$, $LiCoMnO_2$, $LiNiCoO_2$, $LiNiMnO_2$, $LiNiCoMnO_2$, $LiCrO_2$, $LiMn_2O_4$, and mixtures of the foregoing materials.

Suitable anode active materials include lithium metal, lithium alloys, carbonaceous materials, graphites, and the like. However, carbonaceous materials are preferred because they lead to highly reversible intercalation and deintercalation of lithium ions and do not require excess anode active material ($Li_xC_y$), and thus increase the effective energy density of batteries. When sulfur or a sulfur-containing compound are used as the cathode active material, lithium metal is preferred as the anode active material. Carbon black, acetylene black, Ketjenblack, and the like may be used for the conductive agent. It is preferable that the amount of the conductive agent be in the range of 1-20 parts by weight based on 100 parts by weight of the electrode active material.

Suitable examples of such a binder include polyvinylidene fluoride, vinylidene fluoride-hexafluoropropylene (VDF-HFP) copolymer, polyacrylonitrile, polymethylmethacrylate, and a mixture of the foregoing materials. It is preferable that the amount of the binder be in the range of 1-30 parts by weight based on 100 parts by weight of the electrode active material. As the solvent, any solvent commonly used in the electrolyte active material composition for lithium secondary batteries, for example, acetone, N-methylpyrrolidone (NMP), acetonitrile, tetrahydrofuran, and the like, may be used.

Next, the polymer electrolyte formed using the above-described method is interposed between the anode and cathode formed through the above processes. The resulting structure of the anode, the cathode, and the separator interposed therebetween is developed into an electrode assembly by rolling or by stacking more electrodes and polymer electrolyte thereon. The electrode assembly is placed in a battery case and sealed. Alternatively, a network-structured porous film formed of insulating resin may be additionally interposed between the cathode and the anode. Next, an electrolytic solution of a lithium salt in an organic solvent is injected into the battery case with the electrode assembly to provide a complete lithium battery.

According to method (2) for manufacturing polymer electrolytes and lithium batteries, a polymer electrolyte is directly formed on a surface of the cathode or anode, as in method (1) described above, by casting a polymer electrolyte forming composition onto the electrode surface and heating, or UV or electron beam irradiation. The electrodes and polymer electrolyte are combined into an electrode assembly having a roll or stack form and sealed in a battery case. Alternatively, an additional porous separator may be incorporated into the electrode assembly between the cathode and the anode. A liquid electrolyte solution may be additionally injected into the battery case with the electrode assembly, if necessary.

According to method (3), a polymer electrolyte forming composition, a cathode, and an anode are prepared in the same manner as in method (1) described above. The cathode and the anode with a network-structured porous film formed of insulating resin therebetween are combined into an electrode assembly by rolling or by stacking more electrodes and porous film thereon and sealed in a battery case. Any porous film commonly used in lithium batteries and known as a "separator" may be used without limitations. Suitable examples of such a separator include a polyethylene separator, a polypropylene separator, a polyvinylidene fluoride separator, a vinylidene fluoride-hexafluoroprolylene (VDF-HFP) copolymer separator, a bilayer polyethylene/polypropylene separator, a triple layer polypropylene/polyethylene/polypropylene separator, a triple layer polyethylene/polypropylene/polyethylene separator, and the like.

Next, the previously prepared polymer electrolyte forming composition is injected into the battery case with the electrode assembly and heated for polymerization to provide a complete lithium battery according to the present invention. The thermal polymerization may be performed at a temperature of 40-100° C., preferably, 60-80° C., for 30 minutes to 8 hours. If the polymerization temperature exceeds this range, the problems described above occur.

In the lithium battery manufacturing processes described above, during the polymerization, the multifunctional isocyanurate monomer of Formula (1) above and the ethylenically unsaturated monomer are polymerized, thus resulting in the polymer electrolyte in gel form on the electrode and separator.

In addition to the above-described three different methods, a lithium battery may be manufactured by casting or doping a porous separator with the above polymer electrolyte forming composition and curing to form a separator-polymer electrolyte combined structure. A cathode and an anode with the separator-polymer electrolyte combined structure therebetween are formed into an electrode assembly by rolling or stacking more electrodes and the separator-polymer electrolyte combined structure thereon and sealed in a battery case.

It is preferable that a thickness of the polymer electrolyte coated on the porous film be a thickness of 5-90 μm. In this range of thickness, the polymer electrolyte exhibits excellent ionic conductivity.

A method for manufacturing a lithium battery according to the present invention is described below in greater detail with reference to the following examples. It will be understood by those skilled in the art that the spirit and scope of the invention are not limited to the following examples and that various changes may be made therein without departing from the scope of the claims of the invention.

EXAMPLE 1

15 g of polyvinylidene fluoride was dissolved in 600 mL of N-methylpyrrolidone (NMP) by stirring for 2 hours. 470 g of $LiCoO_2$ and 15 g of carbon black (Super-P) were added into the mixture, followed by ball milling to provide a cathode active material composition.

The cathode active material composition was coated onto a 147-μm-thick and 4.9-cm-wide aluminum foil using a 320-μm-gap doctor blade, subject to drying and rolling, and cut into a cathode plate of a predetermined size.

In order to manufacture an anode plate, 30 g of polyvinylidene fluoride was dissolved in 600 mL of NMP by stirring for 2 hours. 470 g of mesocarbon fiber (MCF, available from PETOCA CO.) and 1.0 g of oxalic acid were added into the mixture, followed by ball milling for 5 hours to provide an anode active material composition.

The anode active material composition was coated onto a 178-μm-thick and 5.1-cm-wide copper foil using a 420-μm-gap doctor blade, subject to drying and rolling, and cut into the anode plate of a predetermined size.

A porous polyethylene film was interposed between the cathode plate and the anode plate and rolled into an electrode assembly having a jelly-roll like shape. The electrode assembly roll was placed in an aluminum pouch.

0.5 g of tris-(2-acryloyloxy)ethyl isocyanurate (TAEI), 0.025 g di(4-t-butylcyclohexyl)peroxy dicarbonate (DTBT), and 15 g of an organic solvent mixture with 1.3 M $LiPF_6$ containing ethylene carbonate (EC), ethylmethyl carbonate (EMC), propylene carbonate (PC), and fluorobenzene (FB) in 30:55:5:10 (volume ratio) were mixed together to prepare a polymer electrolyte forming composition. The polymer electrolyte forming composition was injected into the aluminum pouch with the electrode assembly under reduced pressure, sealed, and heated in a 65° C. hot-air oven for 4 hours to provide a complete lithium secondary battery.

EXAMPLE 2

A lithium secondary battery was manufactured in the same manner as in Example 1, except that 0.25 g of TAEI and 0.25 g of diethylene glycol diacrylate were used as monomers for the polymer electrolyte forming composition.

EXAMPLE 3

A lithium secondary battery was manufactured in the same manner as in Example 1, except that 0.25 g of TAEI and 0.25 g of caprolactonated dipentaerythritol hexacrylate were used as monomers for the polymer electrolyte forming composition.

COMPARATIVE EXAMPLE

A lithium polymer battery was manufactured in the same manner as in Example 1, except that 0.5 g of diethylene glycol diacrylate was used as a monomer for the polymer electrolyte forming composition.

Cycle Life Test

The charging-discharging cycle life was measured using the lithium secondary batteries of Examples 1 through 3 and Comparative Example according to the following method.

With a nominal capacity (C) of 750 mAh at an ambient temperature, each of the batteries was charged in a constant current (CC)/constant voltage (CV) mode with a charging current of 1 C for 2.5 hours to a cut-off voltage of 4.2 V. After a 30-minute suspension, the battery was discharged to a cut-off voltage of 3 V in a CC mode at a discharging current of 1C.

FIG. 1 is a graph showing the results of the cycle life test for the lithium batteries manufactured in Examples 1 through 3 and the Comparative Example. Referring to FIG. 1, the lithium battery of Example 1 shows good cycle life properties even after 150 charging-discharging cycles, with an about 96% capacity reserve with respect to the initial discharging capacity. The capacity reserve after 150 charging-discharging cycles was 88% and 91% for the batteries of Examples 2 and 3, respectively, and was 20% for the conventional battery manufactured using only diethylene glycol diacrylate as monomer in the Comparative Example. The lithium secondary batteries of Examples 1 through 3 show extended cycle life, compared with the conventional battery of the Comparative Example.

A safety test was performed using the lithium secondary batteries of Examples 1 through 3 and the Comparative Example according to the following method. After a 3-hour charging to 4.2 V with a current of 0.5 C (equal to 375 mAh), the battery was vertically penetrated through its center with a 5-pi nail at a rate of 40 mm/sec or greater. Five batteries were tested for each of the examples. As a result of the safety test, all of the lithium secondary batteries of Examples 1 through 3 were determined as being quite safe, i.e., L2 level, in which neither combustion nor fire occurs. However, three of the five conventional lithium batteries of the Comparative Example tested were determined to be unsafe, i.e., L5 level, in which both combustion and explosion occur.

Finally, the swelling of the lithium secondary batteries of Examples 1 through 3 and the Comparative Example was measured by measuring the thickness of the battery after a 3-hour charging to 4.2 V with a current of 0.5 C (equal to 375 mAh) and being left in a 90° C.-oven for 4 hours.

As a result of the swelling test, the lithium secondary battery of Example 1 showed a thickness increase of about 3%, whereas the lithium secondary battery of the Comparative Example showed a thickness increase of about 12%. The lithium secondary batteries of Examples 2 and 3 showed a similar degree of swelling to that of Example 1.

As described above, a lithium battery according to the present invention using a polymer electrolyte formed using a multifunctional isocyanurate monomer of Formula (1) above shows extended cycle life, improved safety, and reduced swelling.

While the present invention has been particularly shown and described with reference to exemplary embodiments thereof, it will be understood by those of ordinary skill in the art that various changes in form and details may be made therein without departing from the spirit and scope of the present invention as defined by the following claims.

Although a few preferred embodiments of the present invention have been shown and described, it would be appreciated by those skilled in the art that changes may be made in this embodiment without departing from the principles and spirit of the invention, the scope of which is define in the claims and their equivalents.

What is claimed is:

1. A polymer electrolyte comprising a polymerized product formed by polymerizing a multifunctional isocyanurate monomer of Formula (1) below in a polymer electrolyte forming composition containing the multifunctional isocyanurate monomer, a lithium salt, and a non-aqueous organic solvent:

Formula (1)

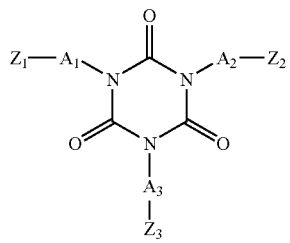

where $A_1$, $A_2$, and $A_3$ are independently $C_1$-$C_{10}$ alkylene groups or $C_1$-$C_{10}$ arylene groups; and $Z_1$, $Z_2$, and $Z_3$ are substitute groups of Formula (2) below:

Formula (2)

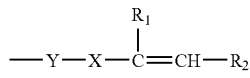

where X is

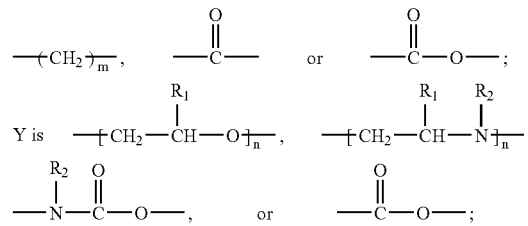

Y is $-\!\!+\!CH_2-CH-O\!\!+\!\!_n$ with $R_1$,  $-\!\!+\!CH_2-CH-N\!\!+\!\!_n$ with $R_1$, $R_2$, $-N-C-O-$ with $R_2$, O, or $-C-O-$;

each of $R_1$ and $R_2$ is at least one independently selected from the group consisting of hydrogen, $C_1$-$C_{10}$ alkyl, $C_1$-$C_{10}$ fluorinated alkyl, $C_1$-$C_{10}$ aryl, and $C_1$-$C_{10}$ fluorinated aryl; m is an integer from 0 to 10; and n is an integer from 0 to 5 and wherein the non-aqueous organic solvent is selected from the group consisting of ethylene carbonate, propylene carbonate, dimethyl carbonate, methylethyl carbonate, diethyl carbonate, methylpropyl carbonate, ethylpropyl carbonate, methylbutyl carbonate, tetrahydrofuran, 2-methyltetrahydrofuran, diethoxyethane, methylformate, ethylformate, triglyme, tetraglyme, fluorobenzene, difluorobenzene, γ-butyrolactone, and mixtures of at least two of the foregoing solvents, and the amount of the organic solvent is in the range of 10-5000 parts by weight with respect to 100 parts by weight of the monomer.

2. The polymer electrolyte of claim 1, wherein the polymer electrolyte forming composition further comprises a polymerization initiator.

3. The polymer electrolyte of claim 2, wherein the polymerization initiator is selected from the group consisting of diacyl peroxides, dialkyl peroxides, peroxy esters, tertiary alkyl hydroperoxides, peroxy ketals, peroxy carbonates, peroxy dicarbonates, azo compounds, and mixtures of at least two of the foregoing materials, and the amount of the polymerization initiator in the polymer electrolyte forming composition is in the range of 0.001-10 parts by weight with respect to 100 parts by weight of the monomer.

4. The polymer electrolyte of claim 1, wherein the lithium salt is selected from the group consisting of $LiPF_6$, $LiClO_4$, $LiBF_4$, $LiBF_6$, $LiCF_3SO_3$, $LiAsF_6$, $LiN(SO_2CF_3)_2$, $LiC_4F_9SO_3$, $LiN(SO_2C_2F_5)_2$, and mixtures of at least two of the foregoing salts, and the concentration of the lithium salt in the polymer electrolyte forming composition is in the range of 0.5-3.0 mol/L.

5. A polymer electrolyte comprising a polymerized product formed by polymerizing a multifunctional isocyanurate monomer of Formula (1) below and an ethylenically unsaturated monomer in a polymer electrolyte forming composition containing the multifunctional isocyanurate monomer, the ethylenically unsaturated monomer, a lithium salt, and a non-aaueous oroanic solvent:

Formula (1)

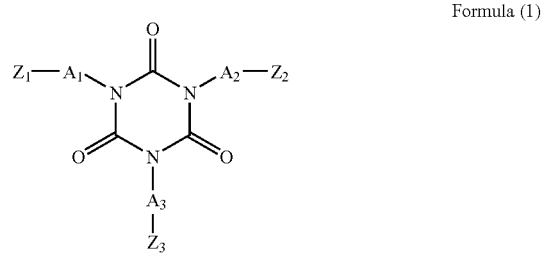

where $A_1$, $A_2$, and $A_3$ are independently $C_1$-$C_{10}$ alkylene groups or $C_1$-$C_{10}$ arylene groups; and $Z_1$, $Z_2$, and $Z_3$ are substitute groups of Formula (2) below:

Formula (2)

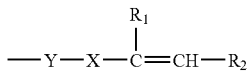

where X is

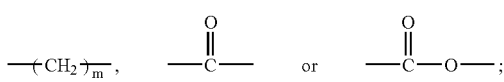

Y is 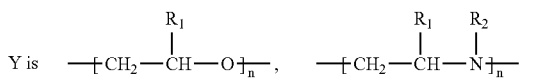

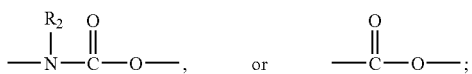

each of $R_1$ and $R_2$ is at least one independently selected from the group consisting of hydrogen, $C_1$-$C_{10}$ alkyl; $C_1$-$C_{10}$ fluorinated alkyl, $C_1$-$C_{10}$ aryl, and $C_1$-$C_{10}$ fluorinated aryl; m is an integer from 0 to 10; and n is an integer from 0 to 5 and wherein the non-aqueous organic solvent is selected from the group consisting of ethylene carbonate, propylene carbonate, dimethyl carbonate, methylethyl carbonate, diethyl carbonate, methylpropyl carbonate, ethylpropyl carbonate, methylbutyl carbonate, tetrahydrofuran, 2-methyltetrahydrofuran, diethoxyethane, methylformate, ethylformate, triglyme, tetraglyme, fluorobenzene, difluorobenzene, γ-butyrolactone, and mixtures of at least two of the foregoing solvents, wherein the amount of the organic solvent is in the range of 10-5000 parts by weight with respect to 100 parts by weight of the monomer;

and wherein the amount of the ethylenically unsaturated monomer in the polymer electrolyte forming composition is not greater than 95 parts by weight with respect to 100 parts by weight of the multifunctional isocyanurate monomer.

6. A lithium battery comprising:

an anode;

a cathode; and a polymer electrolyte interposed between the anode and the cathode, comprising:

a polymerized product formed by polymerizing a multifunctional isocyanurate monomer of Formula (1) below in a polymer electrolyte forming composition containing the multifunctional isocyanurate monomer, a lithium salt, and a non-aaueous oraanic solvent:

Formula (1)

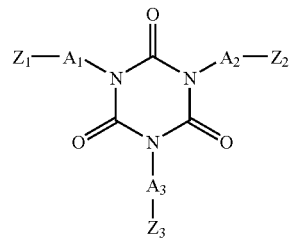

where $A_1$, $A_2$, and $A_3$ are independently $C_1$-$C_{10}$ alkylene groups or $C_1$-$C_{10}$ arylene groups; and $Z_1$, $Z_2$, and $Z_3$ are substitute groups of Formula (2) below:

Formula (2)

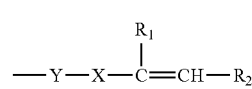

where X is

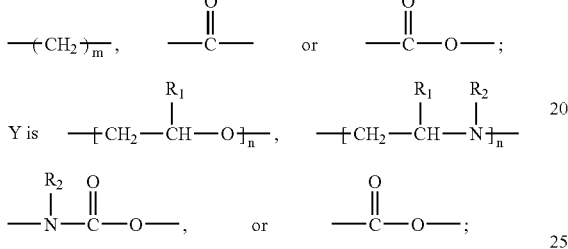

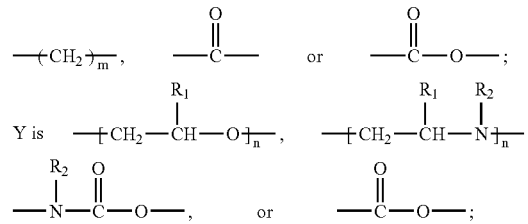

each of $R_1$ and $R_2$ is at least one independently selected from the group consisting of hydrogen, $C_1$-$C_{10}$ alkyl, $C_1$-$C_{10}$ fluorinated alkyl, $C_1$-$C_{10}$ aryl, and $C_1$-$C_{10}$ fluorinated aryl; m is an integer from 0 to 10; and n is an integer from 0 to 5; and wherein the non-aqueous organic solvent is selected from the group consisting of ethylene carbonate, propylene carbonate, dimethyl carbonate, methylethyl carbonate, diethyl carbonate, methyipropyl carbonate, ethylpropyl carbonate, methylbutyl carbonate, tetrahydrofuran, 2-methyltetrahydrofuran, diethoxyethane, methylformate, ethylformate, triglyme, tetraglyme, fluorobenzene, difluorobenzene, γ-butyrolactone, and mixtures of at least two of the foregoing solvents, and the amount of the organic solvent is in the range of 10-5000 parts by weight with respect to 100 parts by weight of the monomer.

7. The lithium battery of claim 6, wherein the cathode is composed mainly of a material selected from the group consisting of lithium manganese oxides, lithium cobalt oxides, lithium nickel oxides, lithium chromium oxides, sulfur, sulfur-containing compounds, and mixtures of at least two of the foregoing oxides.

8. The lithium battery of claim 7, wherein the anode is composed mainly of a material selected from the group consisting of lithium metal, lithium alloys, carbonaceous materials, and graphites.

9. The lithium battery of claim 7, further comprising a porous film between the cathode and the anode.

* * * * *

UNITED STATES PATENT AND TRADEMARK OFFICE
CERTIFICATE OF CORRECTION

| | | |
|---|---|---|
| PATENT NO. | : 7,387,852 B2 | Page 1 of 1 |
| APPLICATION NO. | : 10/440245 | |
| DATED | : June 17, 2008 | |
| INVENTOR(S) | : Yong-beom Lee | |

It is certified that error appears in the above-identified patent and that said Letters Patent is hereby corrected as shown below:

Column 10, line 54, change "non-aaueous" to --non-aqueous--.

Column 12, line 45, change "methipropyl" to --methylpropyl--.

Signed and Sealed this

Twelfth Day of August, 2008

JON W. DUDAS
*Director of the United States Patent and Trademark Office*